US011455257B2

(12) United States Patent
Gopal et al.

(10) Patent No.: US 11,455,257 B2
(45) Date of Patent: Sep. 27, 2022

(54) ULTRA-SECURE ACCELERATORS

(71) Applicant: Intel Corporation, Santa Clara, CA (US)

(72) Inventors: Vinodh Gopal, Westborough, MA (US); Wajdi Feghali, Boston, MA (US); Raghunandan Makaram, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 16/377,230

(22) Filed: Apr. 7, 2019

(65) Prior Publication Data

US 2019/0236022 A1 Aug. 1, 2019

(51) Int. Cl.
*G06F 21/00* (2013.01)
*G06F 12/109* (2016.01)
*G06F 3/06* (2006.01)
*G06F 21/60* (2013.01)
*G06F 9/30* (2018.01)
*G06F 9/46* (2006.01)

(52) U.S. Cl.
CPC .......... *G06F 12/109* (2013.01); *G06F 3/0622* (2013.01); *G06F 3/0659* (2013.01); *G06F 3/0673* (2013.01); *G06F 9/30043* (2013.01); *G06F 9/468* (2013.01); *G06F 21/602* (2013.01)

(58) Field of Classification Search
CPC .... G06F 12/109; G06F 3/0622; G06F 3/0659; G06F 3/0673; G06F 9/30043; G06F 9/468; G06F 21/602
See application file for complete search history.

(56) References Cited

U.S. PATENT DOCUMENTS

| 2001/0042210 A1* | 11/2001 | Blaker ............... G06F 7/728 712/E9.067 |
| 2010/0320523 A1* | 12/2010 | Aritome ............ H01L 29/7881 257/326 |
| 2011/0161620 A1* | 6/2011 | Kaminski .......... G06F 12/1081 711/E12.001 |

(Continued)

OTHER PUBLICATIONS

Expanded European Search Report received for U.S. Appl. No. 16/377,230, dated Jan. 9, 2020, 8 pages.

*Primary Examiner* — Ghodrat Jamshidi
(74) *Attorney, Agent, or Firm* — Compass IP Law PC

(57) ABSTRACT

Methods and apparatus for ultra-secure accelerators. New ISA enqueue (ENQ) instructions with a wrapping key (WK) are provided to facilitate secure access to on-chip and off-chip accelerators in computer platforms and systems. The ISA ENQ with WK instructions include a dest operand having an address of an accelerator portal and a scr operand having the address of a request descriptor in system memory defining a job to be performed by an accelerator and including a wrapped key. Execution of the instruction writes a record including the src and a WK to the portal, and the record is enqueued in an accelerator queue if a slot is available. The accelerator reads the enqueued request descriptor and uses the WK to unwrap the wrapped key, which is then used to decrypt encrypted data read from one or more buffers in memory. The accelerator then performs one or more functions on the decrypted data as defined by the job and writes the output of the processing back to memory with optional encryption.

25 Claims, 12 Drawing Sheets

(56) References Cited

U.S. PATENT DOCUMENTS

| | | | |
|---|---|---|---|
| 2015/0378926 A1* | 12/2015 | Busaba | G06F 12/0808 |
| | | | 711/141 |
| 2016/0179679 A1* | 6/2016 | Morris | G06F 12/0884 |
| | | | 711/137 |
| 2016/0299858 A1* | 10/2016 | Ching | G06F 13/24 |
| 2018/0095750 A1* | 4/2018 | Drysdale | G06F 9/5044 |
| 2018/0114013 A1* | 4/2018 | Sood | G06F 21/606 |
| 2019/0095343 A1* | 3/2019 | Gopal | G06F 12/1027 |
| 2020/0336303 A1* | 10/2020 | Sierra | G01S 13/765 |

* cited by examiner

ULTRA-SECURE ACCELERATORS

BACKGROUND INFORMATION

Data analytics and "Big Data" processing have become increasingly important in recent years. Data analytics and Big Data workloads require processing huge amounts of data. One approach for processing such huge amounts of data is to distribute the processing tasks across large numbers of servers and process the workload in parallel. For example, the Apache Hadoop software framework enables tasks to be distributed across large numbers of commodity servers and process workloads using MapReduce. While Hadoop and MapReduce provide excellent scalability, they require a tremendous amount of inter-server communication (when implemented at large scale), and do not efficiently use processor and memory resources.

Some compute and memory-bandwidth intensive workloads such as used for data analytics and Big Data are hard to get the required level of performance with processor cores. To address this, so-called "accelerators" have been developed. Accelerators were initially implemented as components that were coupled to CPUs (central processing units) and managed as an IO (input-output) device with its own address space, which requires significant levels of IO communication to transfer data between the accelerator address space and applications running in system memory address space. Recently, CPUs employing System on a Chip (SoC) architectures with embedded accelerators have been introduced.

Accelerators have steadily improved in capability with one of the most significant recent trends being "shared virtual memory" (SVM) capable accelerators. The traditional accelerator needed to be managed as an IO device in its own personal address space; this was accomplished with expensive kernel-mode drivers (KMD) that needed applications to cross back and forth between user and kernel-space, pinning pages in memory or copying user buffers to/from special buffers managed by the OS/Kernel-mode-driver. With SVM, the accelerator or IO device can directly work on the address space of user application thread running on a CPU, as it shares the same virtual→physical address translation capabilities as the user application thread. This is a key improvement in accelerator efficiency (from the point of view of data movement), enables user-mode submissions directly to the accelerators (via a "user-mode-driver" or UMD) and results in easier programming models and adoption.

One problem with executing accelerator threads in user-space is security. Under a conventional approach, an accelerator would be required to have a comprehensive cryptographic processor with key-handling capabilities, and an involved protocol for a secure session to be established between the CPU core and the accelerator, whereby the secret material can be transported using key-based encryption. It is very unlikely that such a transfer can be done in user-mode. If the kernel mode driver is invoked to initiate such a transfer, then all the gains of user-mode access for the data processing would be lost.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6a is a combined schematic and dataflow diagram illustrating one embodiment of an implementation of the Enq_with_WK_v1 instruction using the platform architecture of FIG. 3a;

DETAILED DESCRIPTION

Figure 1:
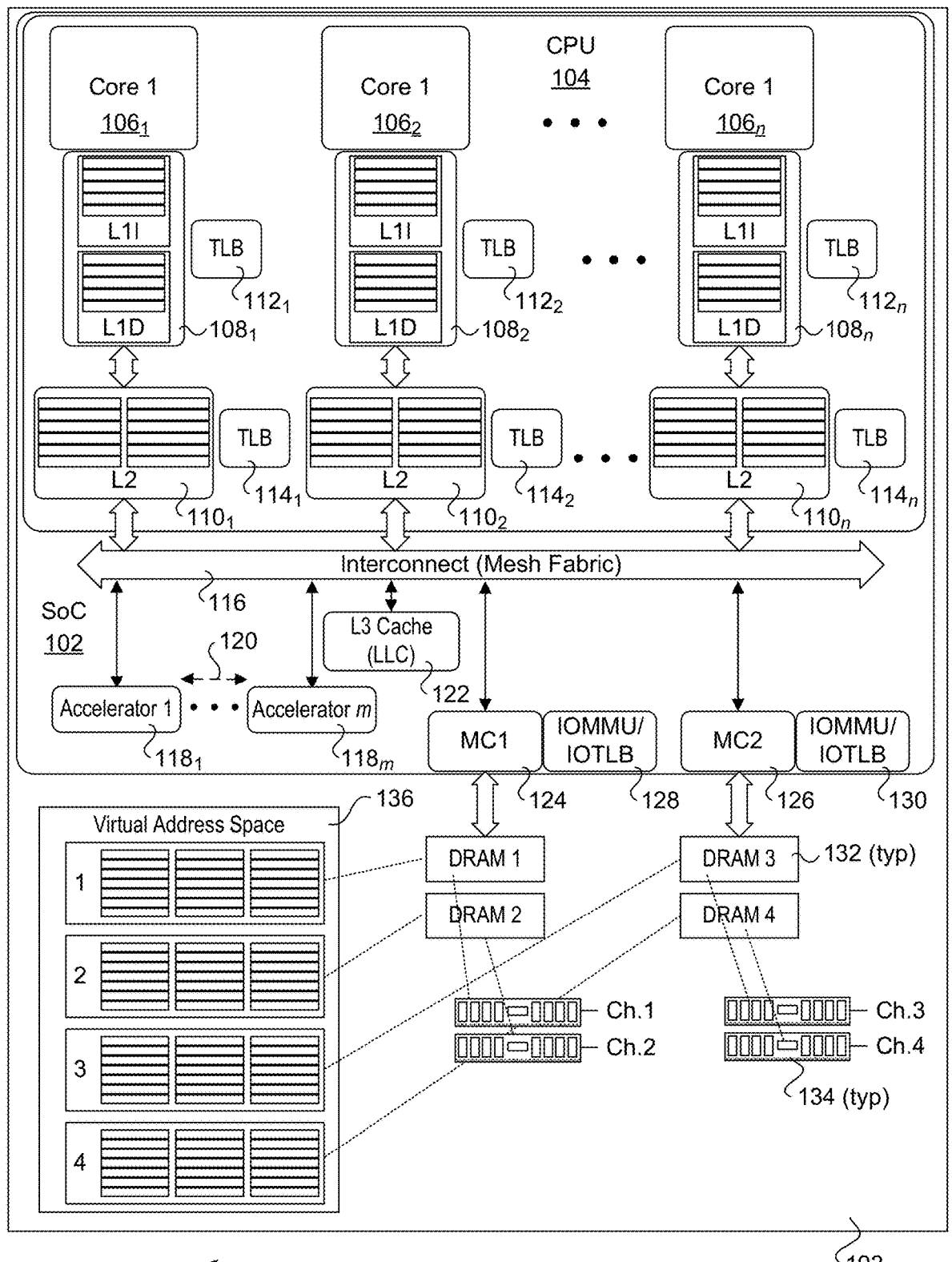
FIG. 1 is a schematic diagram of a first platform architecture including one or more on-chip accelerators.

Embodiments of methods and apparatus for ultra-secure accelerators are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, methods and apparatus to facilitate secure access to on-chip and off-chip accelerators in computer platforms and systems are provided. The embodiments enable user applications executing in user-mode to off-load processing tasks to SVM-capable accelerators in a secure manner through use of new instruction set architecture (ISA) enqueue (ENQ) instructions with a wrapping key (WK). The ISA ENQ with WK instructions employ multiple security mechanisms to enable secure access to authorized user applications, while ensuring malicious software cannot access the accelerators.

Figure 2:
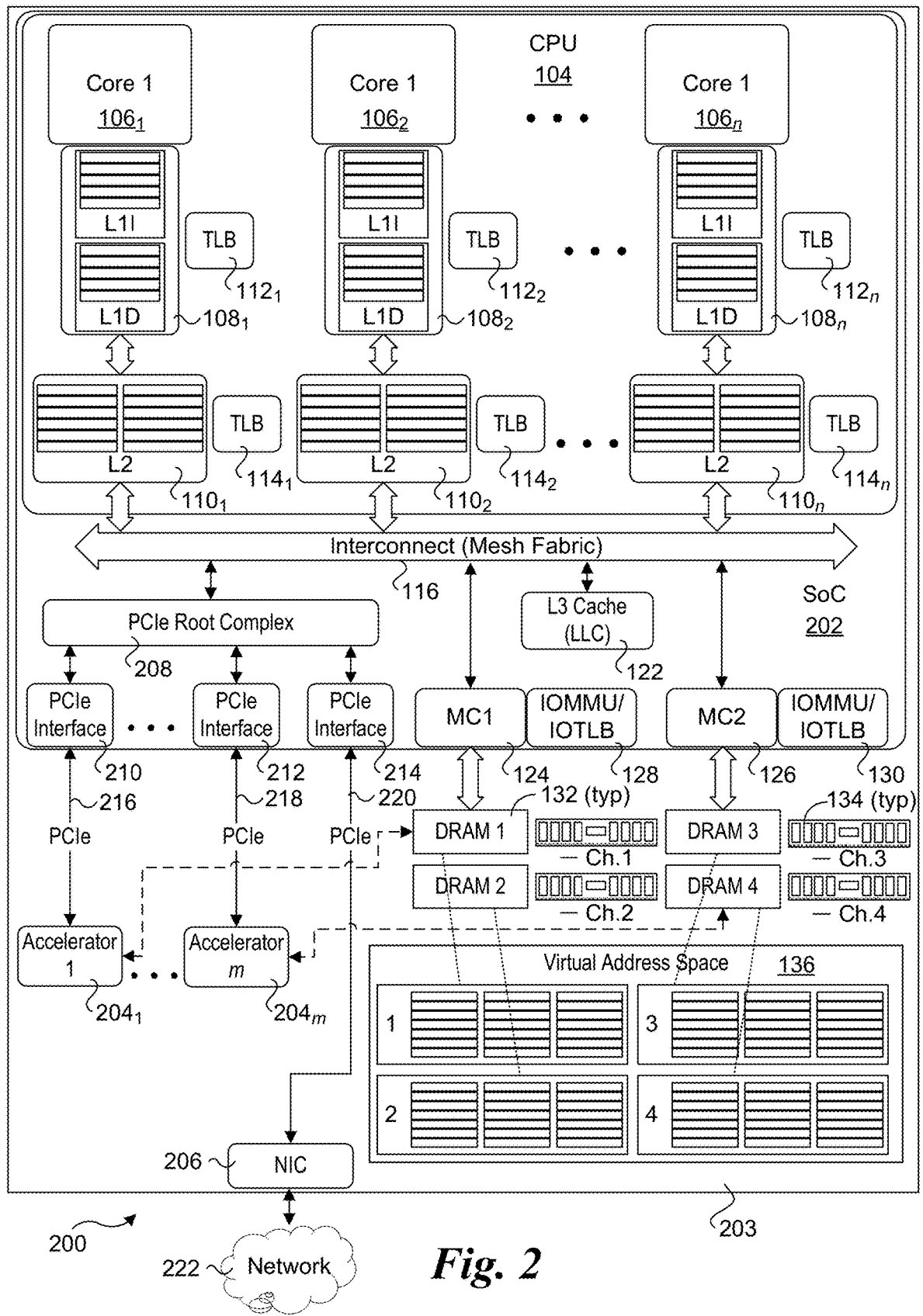
FIG. 2 is a schematic diagram of a second platform architecture including one or more off-chip accelerators.

FIGS. 1 and 2 show exemplary platform architectures 100 and 200 under which aspects of the embodiments described herein may be implemented. Platform architecture 100 includes a processor 102 having a System on a Chip (SoC) architecture mounted to a main board 103. Processor 102 includes a central processing unit (CPU) (also referred to as the core or core unit) including n processor cores $106_1$-$106_n$, wherein n is an integer. For example, n might be 2, 4, 6, 8, 10, 12, 16, or an even higher number. More generally, processor 102 is a multi-core processor, meaning it has at least two processor cores. Each of processor cores $106_1$-$106_n$ is coupled to first (L1) and second level (L2) caches, as depicted by L1 caches $108_1$-$108_n$ and L2 caches $110_1$-$110_n$. As further illustrated each L1 cache $108_1$-$108_n$ includes both an instruction cache (L1I) and a data cache (L1D).

Each of the L1 and L2 caches is associated with a respective translation lookaside buffer (TLB), as illustrated by TLBs $112_1$-$112_n$ for L1 caches $108_1$-$108_n$ and TLBS $114_1$-$114_n$ for L2 caches $110_1$-$110_n$. As further described and illustrated below, in some embodiments each of the L1 instruction and data caches L1I and L1D may have a respective TLB.

Processor 102 includes various interconnection circuitry that is used to interconnect various components on the processor. For simplicity, the interconnection circuitry is illustrated as an interconnect 116, which is also referred to as a mesh fabric. In practice, the mesh fabric may include one or more levels on interconnect infrastructure and an interconnection hierarchy, while each level may comprise a separate hierarchy unto itself (e.g., nested interconnected hierarchies). Generally, a given interconnect hierarchy may employ both structure and operations defined by standardized protocols or proprietary protocols. Moreover, there may be bridges between layers to enable interfacing between different types of protocols.

Various components on processor 102 are interconnected via interconnect 116, including L2 caches $110_1$-$110_n$ (one or more) accelerators $118_1$-$118_m$, a third-level (L3) cache 122 (also referred to as a last-level cache or LLC), and a pair of memory controllers 124 and 126 (also labeled MC1 and MC2). It is further noted that each of the components illustrated for each processor core, including the core, the L1 cache and the TLBs is communicatively coupled to interconnect 116, via either direct or indirect connection.

Each of memory controllers 124 and 126 also has an associated IOMMU and IO TLB, collectively depicted as IOMMU/IOTLB block 128 and 130. In embodiments implementing multiple accelerators, the accelerators may be interconnected in a chain, as represented by dashed double-arrow 120. As further shown in FIG. 10, a processor will generally have additional components and interconnection circuitry that is not shown due to lack of space, including IO components and interfaces supporting communication with external IO components and expansion slots.

Each of memory controllers 124 and 126 includes one or more channels connected to one or more DRAM (Dynamic Random Access Memory) memory devices 132, such as Dual In-line Memory Modules (DIMMs) 134. In FIG. 1, these DRAM memory devices are depicted as DRAM 1-4. In the illustrated embodiment, a respective memory channel is connected to each DRAM memory device 132, as indicated by Ch. 1, Ch. 2, Ch. 3, etc., where "Ch." means channel. However, this is merely exemplary, as a memory controller may have more than one memory channel connected to the same memory device.

Each of DRAM memory devices 132 has a physical address space. Generally, the physical address space is partitioned into units of "pages," which are further partitioned into units of cachelines, although other addressing scheme may be used. The physical address spaces of the DRAM memory devices are mapped to a virtual address space, as shown by a virtual address space 136. The virtual address space is usually partitioned into a plurality of virtual memory "pages," and accessed at the page level, noting that individual cachelines may also be accessed with the pages. Mapping between the virtual and physical address spaces is generally handled by the memory controller and/or other platform components, including the IOMMU and the TLBs. The operating system may provide further aspects of this mapping, depending on the platform.

In one embodiment, processor 102 is operatively coupled to a printed circuit board comprising main board 103 via a "socket," or otherwise coupled to the main board via a direct coupling technique, such as flip-chip bonding. In either case, it is common practice in the art to refer to the processors themselves as sockets. Generally, main board 103 includes electrical wiring (e.g., traces and vias) to facilitate electrical connections corresponding to the physical structure of various interconnects depicted in FIG. 1.

Platform architecture 200 of FIG. 2 includes a processor 202, four DRAM memory devices 132, m accelerators $204_1$-$204_m$, and a Network Interface Controller (NIC) 206 mounted our otherwise coupled to a main board 203. In addition to components with like reference numbers in FIGS. 1 and 2, processor 202 includes 10 components and interfaces comprising a PCIe (Peripheral Component Interconnect Express) Root Complex 208 coupled to multiple PCIe interfaces, depicted as PCIe interfaces 210, 212, and 214. PCIe interface 210 is coupled to accelerator $204_1$ via a PCIe link 216, while PCIe interface 212 is coupled to accelerator $204_m$ via a PCIe link 218 and PCIe interface 214 is coupled to NIC 206 via a PCIe link 220. PCIe supports various lane widths and speeds, including 1x, 2x, 4x, 8x, and 16x configurations, wherein 'x' represents the number of lanes. Both existing and future PCIe links and interfaces may be used for the PCIe links and interfaces shown FIG. 2 and discussed herein.

Generally, an off-chip accelerator may comprise a chip (e.g., a Field Programmable Gate Array (FPGA) or a chip with fixed, pre-programmed logic) that is mounted to the main board or may reside on an accelerator board or card that is installed in a PCIe expansion slot. It is also possible to have multiple accelerator chips on the same board or card.

As discussed in further detail below, an off-chip accelerator, such as accelerators $204_1$-$204_m$, may include a memory controller or other type of memory interface that enables the accelerator to access system memory devices over one or more memory channels. This is illustrated in FIG. 2, where accelerator $204_1$ is connected to DRAM 1 via memory channel 1, while accelerator $204_m$ is connected to DRAM 4 via memory channel 4, wherein the dashed line indicates the connections are optional.

Through use of Direct Memory Access (DMA) support provided by PCIe and related components, NIC 206 is enabled to access system memory (e.g., DRAM memory devices 1-4) without requiring use of CPU 104. In addition, DMA operations may also be used to support data transfers between NIC 206 and one or more of accelerators $204_1$-$204_m$, thus enabling packet processing operations for network traffic being received from and/or sent to a network 222 to be offloaded to one or more accelerators.

In addition to platform architecture using on-chip accelerators and off-chip accelerators, hybrid platform architecture that include both on-chip and off-chip accelerators are supported. The architectures generally combine applicable aspects of the on-chip and off-chip accelerators described herein.

Figure 3A:
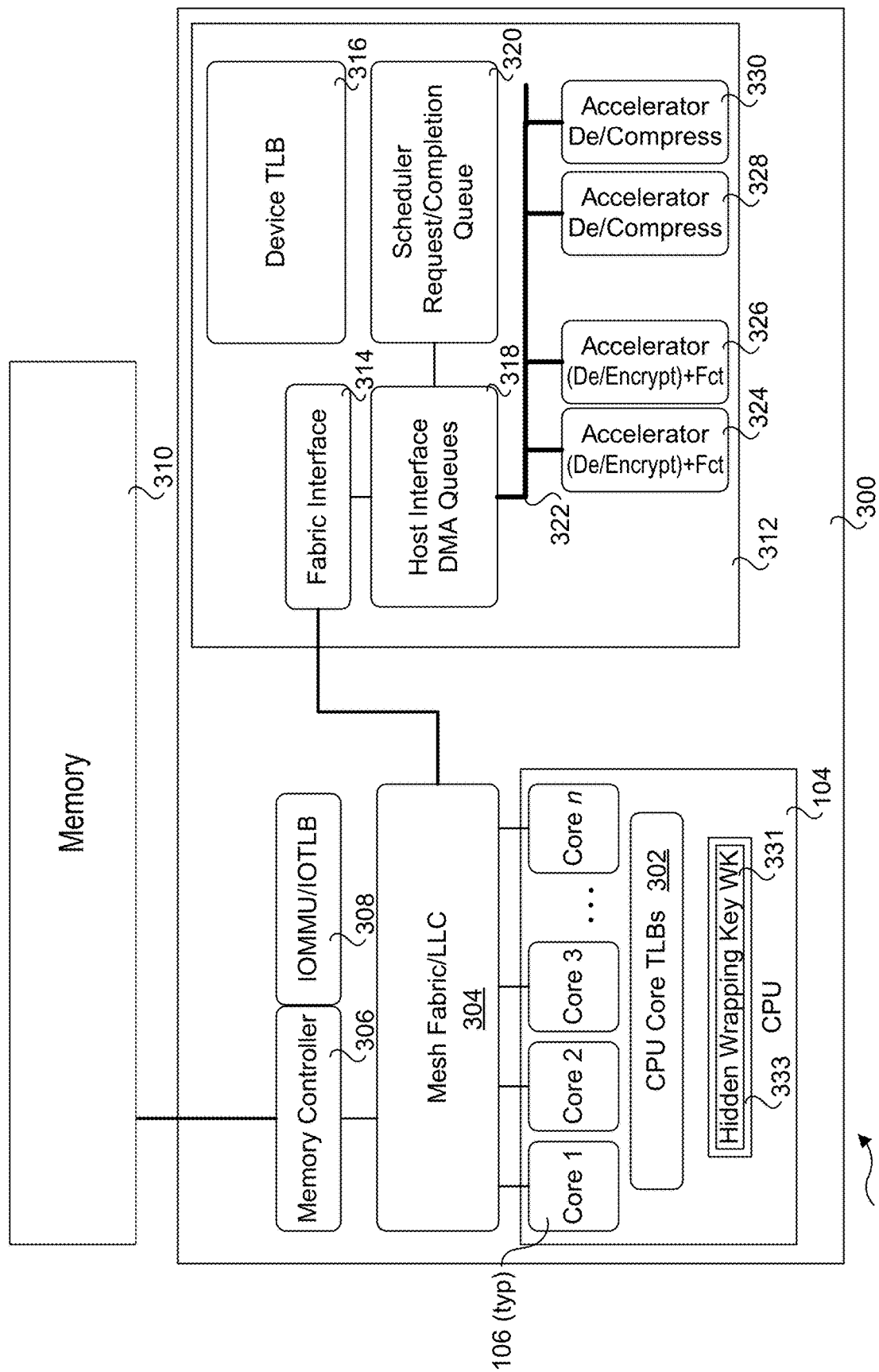
FIG. 3a is a schematic diagram illustrating further details of an on-chip accelerator, according to one embodiment.
Figure 3B:
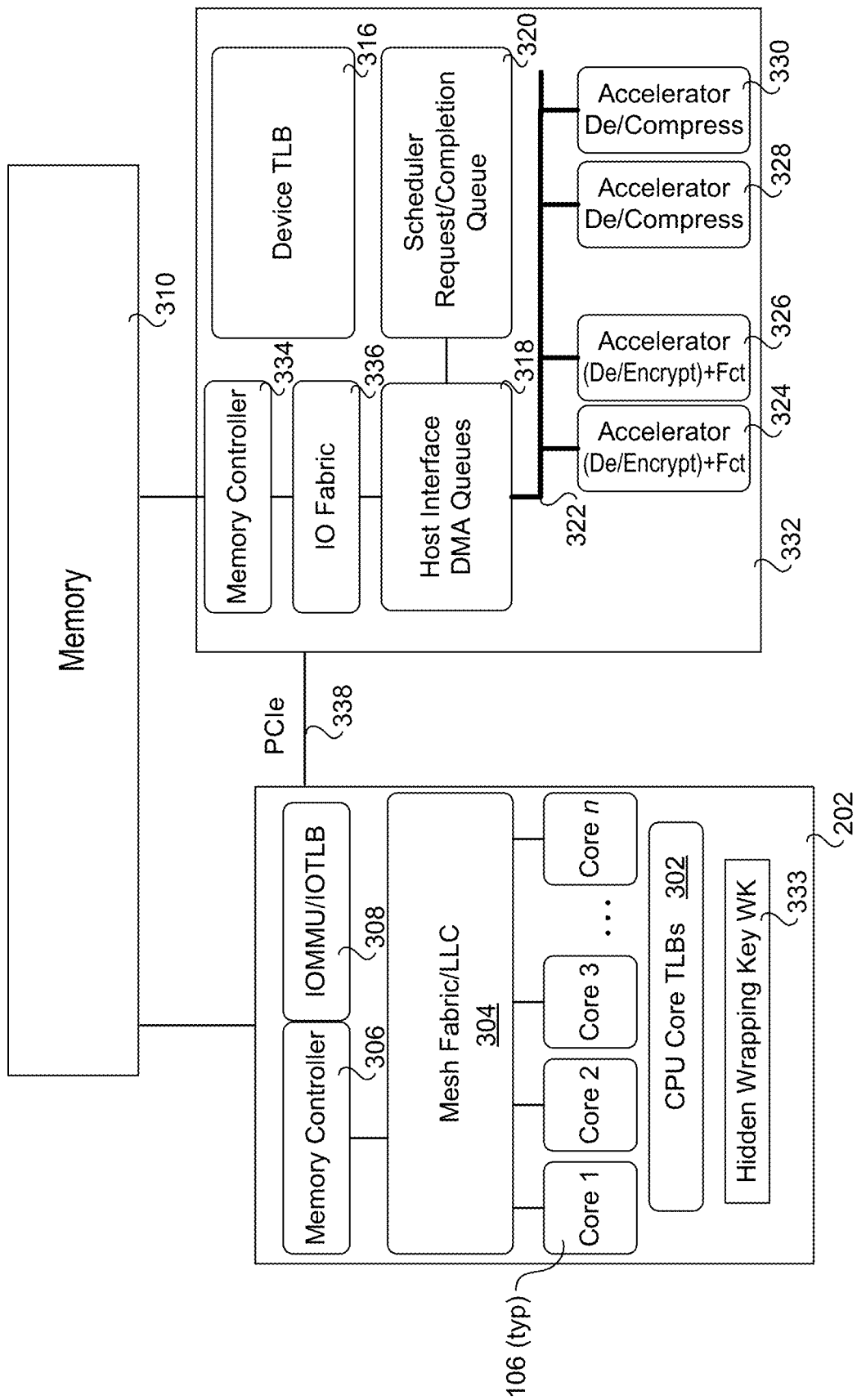
FIG. 3b is a schematic diagram illustrating further details of an off-chip accelerator, according to one embodiment.

FIGS. 3a and 3b show further details of the processors and accelerators shown in FIGS. 1 and 2. FIG. 3a shows a platform architecture 100a including a processor 300 having an on-chip accelerator 302 (also referred to as an accelerator complex when the accelerator supports multiple instances of accelerator functions). Processor 300 includes CPU 104 that comprises similar components shown for CPU 104 in FIGS. 1 and 2, collectively depicted as n cores 106 and CPU core TLBs 302; it will be recognized that CPU 104 would further include L1 and L2 caches, and the TLBs 302 are representative of TLBs $112_1$-$112_n$ and TLBS $114_1$-$114_n$ of FIGS. 1 and 2. Interconnect 116 and LLC 122 of processor 102 are collectively illustrated as a mesh fabric/LLC block 304, which is coupled to a memory controller 306 with an associated IOMMU/IOTLB 308. Memory controller 306 is coupled to memory 310, which is illustrative of one or more DRAM memory devices 132 of FIGS. 1 and 2. As before, memory controller 306 would be coupled to the DRAM memory devices with one or more memory channels per DRAM memory device (not shown).

FIG. 3a further shows an embodiment of an on-chip accelerator 312, which is representative of various types of accelerators. On-chip accelerator 312 includes a fabric interface 314, a device TLB 316, host interface DMA queues 318, a scheduler request/completion queue 320, and a bus 322 to which multiple accelerators are coupled as depicted by accelerators 324, 326, 328, and 330. compression and decompression blocks are coupled, as depicted by compress blocks 324 and 326, and decompress blocks 328 and 330. Fabric interface 314 is generally illustrative of various types of IO interfaces that can connect an on-chip accelerator to the interconnect infrastructure on the processor/SoC, as collectively illustrated and described herein as a mesh fabric. The interconnect structure and protocol may generally include both proprietary and standards-based interconnects.

Accelerators are generally used to off-load CPU intensive tasks from a processor's cores, such as compression and decompression functions, which are math-intensive. In the embodiments herein, some or all of the accelerators may be further configured to generate a decryption key and used the decryption key for performing decryption and (optional) encryption operations. For illustrative purposes, accelerators 324 and 326 are depicted as being configured to perform the decryption and encryption operations in addition to one or more functions, such as but not limited to compression and decompression. Meanwhile, accelerators 328 and 330 are depicted as performing compression and/or decompression operations (without decryption or encryption).

Generally, an accelerator may include embedded circuitry and logic that is tailored to efficiently perform one or more specialized tasks, such as the decryption, encryption, compression, and decompression functions depicted for the accelerators illustrated herein. The circuitry may be in the form of an ASIC (application-specific integrated circuit), or may include programmable circuitry/logic, such as provided via an FPGA. Such an FPGA may comprises one or more FPGA blocks, such as are available via license from various manufacturers. An FPGA block may also incorporate a custom design. Generally, the ASIC, FPGA block, or similar embedded circuitry and logic is referred to herein as a functional unit, which is designed to perform a corresponding function. A given accelerator may include one or more functional units.

More generally, an accelerator may also be referred to as an "engine," wherein the engine may be programmed to perform one or more dedicated functions. In some embodiments, an engine may operate in a similar manner to an embedded processor, and be enabled to execute instructions (e.g., accelerator application/function instructions) for dedicated functions. An engine may also combine both execution of instructions in combination with embedded circuitry and logic.

Under the embodiment of FIG. 3b, a platform architecture 200a includes a processor 202 coupled to an off-chip accelerator 332. Processor 202 generally includes components similar to processor 202 of FIG. 2, as collectively illustrated in a manner similar to FIG. 3a, including n cores 106, CPU core TLBs 302, mesh fabric/LLC 304, memory controller 306, and IOMMU/IOTLB 308. Likewise, components and blocks of off-chip accelerator 332 and one-chip accelerator 312 with the same reference numbers operate in a similar manner to that described above with reference to FIG. 3a.

In addition to these components and blocks, off-chip accelerator 332 further includes a memory controller 334 and an IO fabric block 336. In the illustrated embodiment, memory controller 334 is coupled to memory 310, which, as discussed above, is representative of one or more DRAM memory devices. As such memory controller 334 may generally be connected to one or more DRAM memory devices via one or more memory channels.

In the illustrated embodiment of FIG. 3b, off-chip accelerator 332 is connected to processor 202 via a PCIe link 338. Accordingly, each of processor 202 and off-chip accelerator 338 would further include a PCIe interface at the opposing ends of PCIe link 338 (not shown for clarity). As discussed above, an off-chip accelerator may be included an accelerator board or card installed in a PCIe expansion slot or the like, as well as being mounted to a main board. In addition to PCIe, other means of communication may be employed for coupling an off-chip accelerator in communication with a processor.

Host Interface DMA queues 318 and scheduler request/completion queue 320 enable on-chip accelerators 312 and off-chip accelerator 332 to support DMA operations under which accesses to memory 310 and other platform components (e.g., NIC 206 of FIG. 2) are performed without requiring any CPU involvement. For example, under an accelerator configured to support compression and decompression, network traffic received at a receive port on a NIC may be decompressed by an accelerator prior to forwarding the traffic for further processing by a network stack implemented via execution of software instructions on a processor core. Similarly, for outbound traffic (i.e., data to be send onto a network via a NIC transmit port), the traffic may be compressed by an accelerator.

Secure Accelerator Operation using Hidden Wrapping Key

A high-value key is something a user values and wants to protect even if some encrypted data gets compromised. In recent years, Intel® Corporation has introduced technologies such as SGX (Software Guard Extensions) that can provide a software context such high assurance. In the following description of some embodiments, a secure execution context such as SGX is used to describe the problem and solution, but this is exemplary and non-limiting, as the principles and teachings disclosed herein may be extended to other security mechanisms.

When a thread executes in a secure context, software has a way to take a high-value key and encrypt it when it stores the high-value key in memory. The key is "wrapped" using a special hidden processor key that cannot be directly accessed by software. The user key cannot be decrypted (even by the user that created it), except through use of certain instructions in the processors instruction set architecture (ISA). In that limited scenario, hardware in the CPU will unwrap the key temporarily to be able to decrypt the data, but never store the plaintext version of the key in memory.

While this is ultra-secure, it is not scalable to very high throughput rates of data processing. If the user wants to use an accelerator to offload the decryption computes, there is no mechanism to do this from user-space. A typical user-mode access to an accelerator requires sending a job descriptor (called a request descriptor) in memory to the accelerator. As the accelerator is an IO device, some mechanism is required to ring a doorbell in its address-space, such as with a special ENQ instruction. The accelerator will read the descriptor contents from memory and process the job. However, it can't use the wrapped high-value key in memory because that can only be unwrapped by a hardware unit in the CPU core.

Under one approach described below, the solution is to define a new ENQ (Enqueue) instruction that can transport the hidden key from the CPU register space as part of the ENQ payload, such as in a record including the hidden key that references a job descriptor included in the ENQ payload. The ENQ instruction will not send data to the accelerator, such as defined by current ENQ instructions; rather, in one embodiment the ENQ instruction will send a record with the hidden wrapping key and a memory address via which the job descriptor may be accessed. Under an optional scheme, the wrapping key and the job descriptor form the record that is directly written to an accelerator portal. This scheme assumes that the descriptor information is small such that all of information can fit in one cacheline. Under either scheme, the accelerator will only use this wrapping key in an ephemeral way, decrypting data with it and then discarding it.

A first example of a hidden wrapping key WK 331 is depicted as being stored in a register 333 that is part of CPU 104 of processor 300 in FIG. 3*a*. FIG. 3*b* shows a second example of a hidden wrapping key WK 333 in processor 202. As explained below, under other embodiments the wrapping key may be stored in other processor or processor core registers, such as YMM registers.

In accordance with aspects of the WK approach, a CPU thread that needs to access an accelerator submits its request by writing it to a specific memory address (that has been memory-mapped to the input portal of the accelerator device). The memory address is discovered earlier by the thread by a kernel call that handles discovery/enumeration of accelerators and their functionality.

The thread cannot read/write this memory location by normal load/store instructions, but rather can only write to it and receive an acknowledgement from the device (whether it has been accepted or not) using a new Instruction Set Architecture (ISA) instruction (i.e., a new instruction that is included in the ISA of a processor). The hardware of the CPU Core augments the descriptor payload with additional information such as a process-ID number and critically, the hidden wrapping key WK.

Pseudocode for implement one embodiment of an ISA instruction with the foregoing functionality is shown in LISTING 1.

---
LISTING 1
---

1. Enq_with_WK_v1 m64 dest, m64 src {
2. // dest has the address of Accelerator portal to enqueue the job
3. // src has the address of the descriptor from the user
4. // application
5. // assume descriptor has a format such as:
6. //    num-input-buffers
7. //    input-buffer1-pointer
8. //    input-buffer1-size
9. //    input-buffer2-pointer
10. //    input-buffer2-size
11. //    . . .
12. //    num-output-buffers
13. //    output-buffer1-pointer
14. //    output-buffer1-size
15. //    . . .
16. //    Key K (wrapped)
17. //    Other payload (e.g., function opcodes, operation flag(s)
18. //    completion record pointer,. . .) PL
19.
20. Check if dest is a legitimate accelerator portal
21. Write a 64-byte (Cache-line sized) record to dest consisting of:
22.    Process-ID#
23.    Src (64-bit address)
24.    256-bit wrapping key WK
25.
26. Wait for acknowledgement from Accelerator
27. Return pass/fail
28. }

---

The Enq_with_WK_v1 instruction includes two parameters (operands) dest and src, which are respective stored in first and second m64 64-bit registers. m64 notation means that the operand is a pointer to memory so that content will be used in a load/store instruction. As shown in LISTING 1, dest stores the address of the accelerator portal to which the descriptor is written, while src stores the address of the descriptor from the user application.

As further shown in lines 6-18, in the embodiment of LISTING 1 the descriptor has a format that includes the number of input buffers, a pointer to each input buffer (e.g., input-buffer1-pointer, input-buffer2-pointer . . . ), and the size of each input buffer (as depicted by input-buffer2-size, input-buffer2-size . . . ), the number of output buffers, a pointer and size of each output buffer (as depicted by output buffer1 pointer, output buffer1 size . . . ), a wrapped key K, and other payload information, such as function opcodes, operation flag(s), a completion record pointer, etc.

Figure 4:
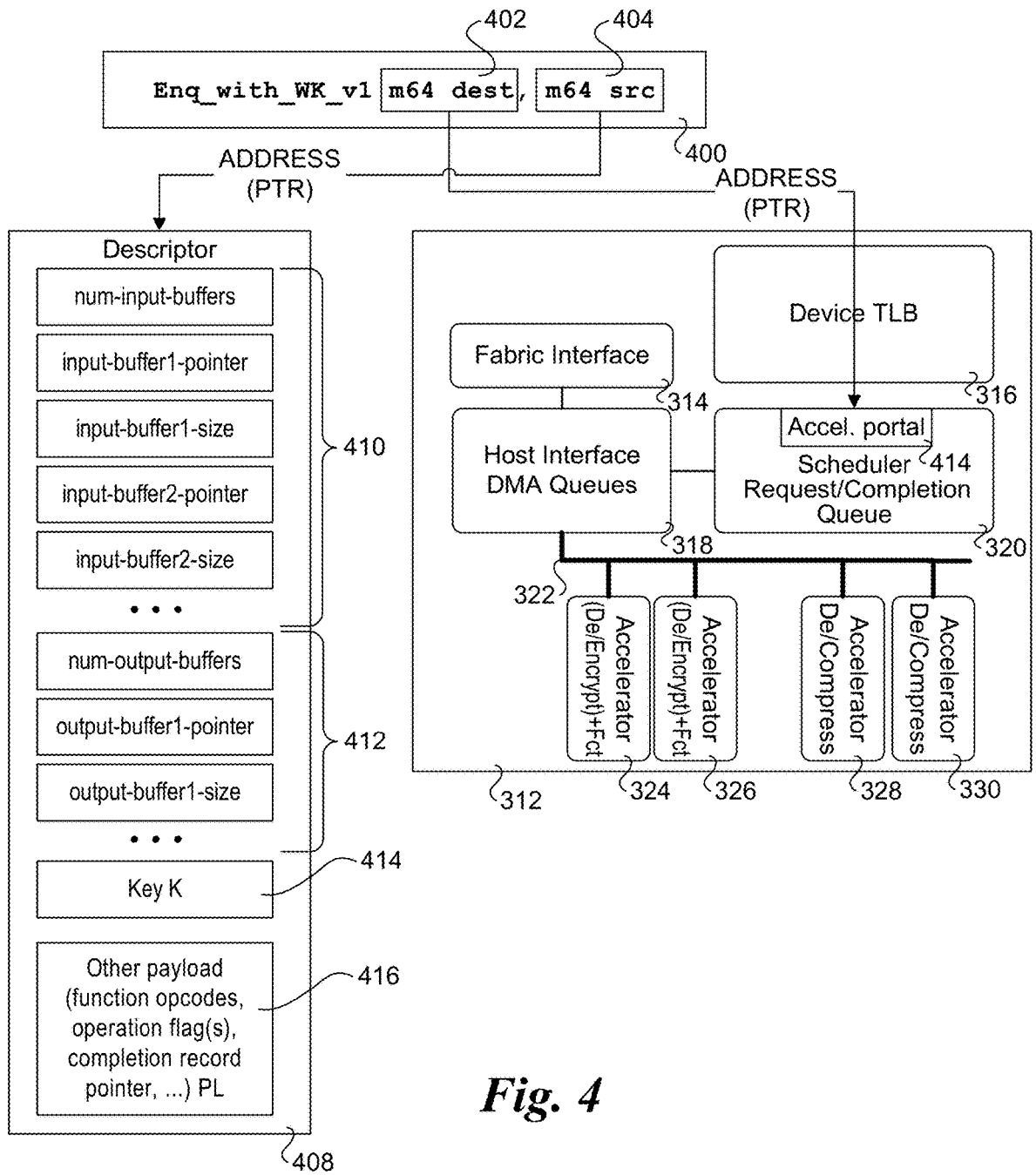
FIG. 4 is a schematic diagram illustrating details of the Enq_with_WK_v1 instruction, its operands, and a request descriptor, according to one embodiment.

A schematic depiction of the Enq_with_WK_v1 instruction 400, its operands, and associated data structures and selected components is shown in FIG. 4. As shown in LISTING 1 and FIG. 4, dest operand 402 contains the 64-bit address of an accelerator portal to enqueue the job, as depicted by an accelerator portal 406 that has been added to scheduler completion queue 320. Such addresses are also commonly referred to as pointers (PTR). Src operand 404 contains the 64-bit address (PTR) of a descriptor 408, which includes parameters 410 associated with input buffers (corresponding to lines 6-11 in LISTING 1), parameters 412 associated with one or more output buffers (corresponding to lines 12-15 in LISTING 1), a wrapped key K (item 414, line 16), and other payload PL 416 (lines 17-18).

Figure 5A:
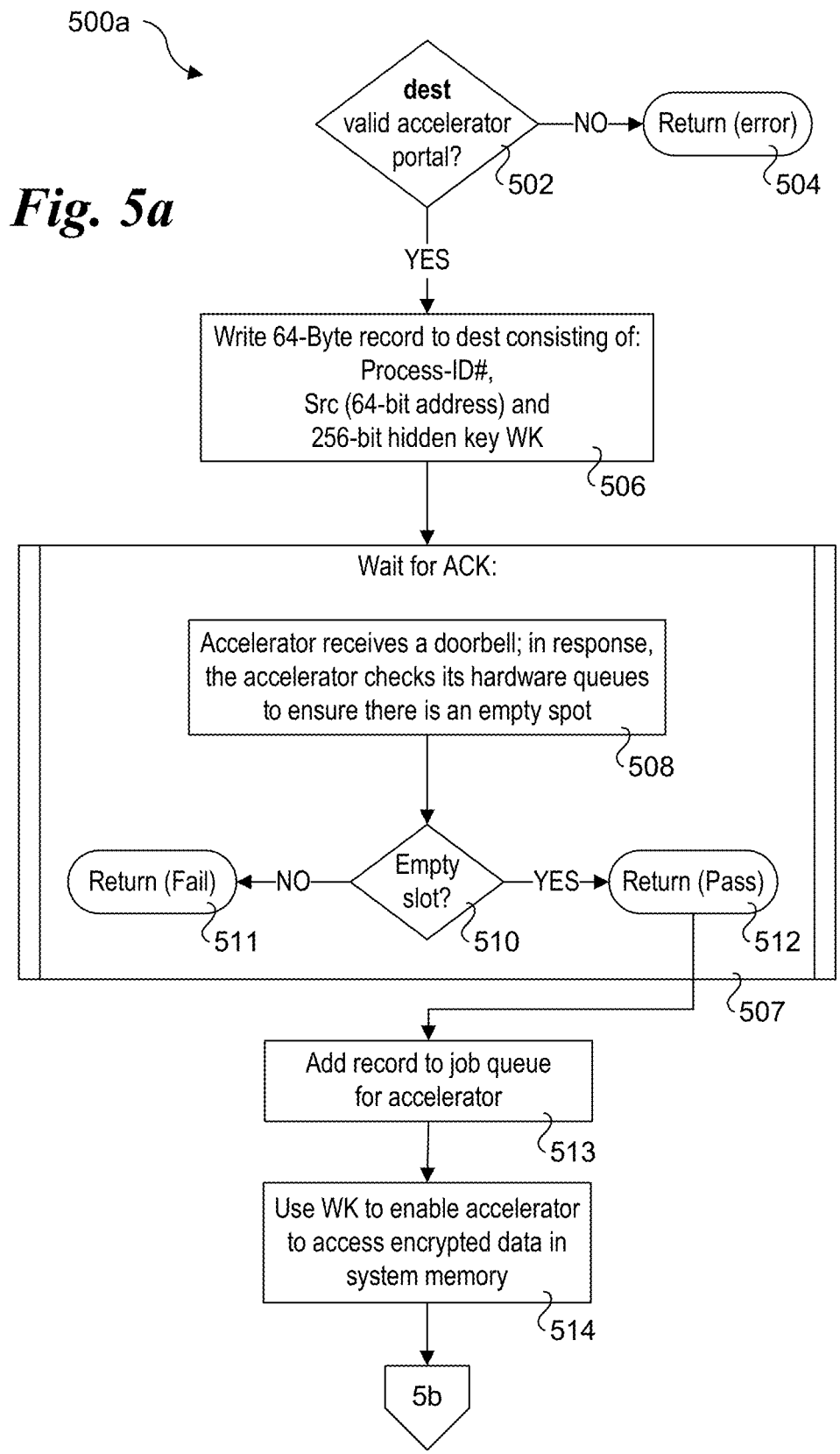
FIG. 5a is a flowchart illustrating operations and logic performed by the Enq_with_WK_v1 instruction, according to one embodiment.

Lines 20-27 of LISTING 1 describe operations and logic performed by the Enq_with_WK_v1 instruction, according to one embodiment. These operations and logic are schematically depicted in flowchart 500a of FIG. 5a, which proceeds as follows.

Since the Enq_with_WK_v1 instruction may be executed in user-mode, it is desired to ensure security of the Enq_with_WK_v1 instruction in user mode. For example, it might be possible for a malicious user to attempt to write out WK in memory. In one embodiment this is prevented by requiring the dest address to correspond to a valid ENQ portal address. Accordingly, the Enq_with_WK_v1 instruction will check if the address for the ENQ accelerator portal is valid.

The corresponding logic to this check is illustrated by a decision block 502 corresponding to line 20, in which a check is made to determine if dest is a valid accelerator portal—that is, a determination is made to whether dest points to a location (address) of a valid accelerator portal. If it does not, the answer to decision block 502 is NO, and a corresponding error indicating such is returned in a return block 504.

If dest is a valid accelerator portal address, the answer to decision block 502 is YES, and the logic proceeds to a block 506 wherein a 64-byte record is written consisting of the Process-ID# (of the thread calling the Enq_with_WK_v1 instruction), the src operand and the hidden key WK, which in one embodiment is a 256-bit key. The corresponding pseudo-code is shown in lines 21-24 of LISTING 1.

At this point, the execution thread waits for an ACKnowledgment (ACK) from the accelerator to determine whether the record has been successfully enqueued or not, as depicted by a Wait for ACK process 507 and corresponding to line 25. In one embodiment, when a record is written to an accelerator portal a "doorbell" is rung to inform the accelerator of the record. A doorbell or doorbell ring is effectively a signal or that like that is received by the accelerator indicating it has new work to perform. In response to receiving the doorbell, the accelerator checks its hardware queues to ensure there is an empty slot (for the record to be added to a hardware queue), as depicted by a block 508 and a decision block 510

If there are no empty slots, the answer to decision block 510 is NO and a Fail is returned as the ACK to the execution thread in a return block 511. Optionally, a value representing the current queue depth may be returned, which is used as a proxy for an expected wait time after which a slot should be available (not shown). If there is an empty slot, a Pass is returned as the ACK in a return block 512 and the logic proceeds to a block 513 in which the record is added to the job queue of the accelerator. For example, in the context of the accelerators of FIGS. 3a and 3b, the record is added to (enqueued in) a job queue in scheduler request/completion queue 320. The logic then proceeds to a block 512 where the wrapping key WK is used to enable the accelerator to decrypt encrypted data that is accessed from shared memory while the processor core is operating in user mode.

Figure 5B:
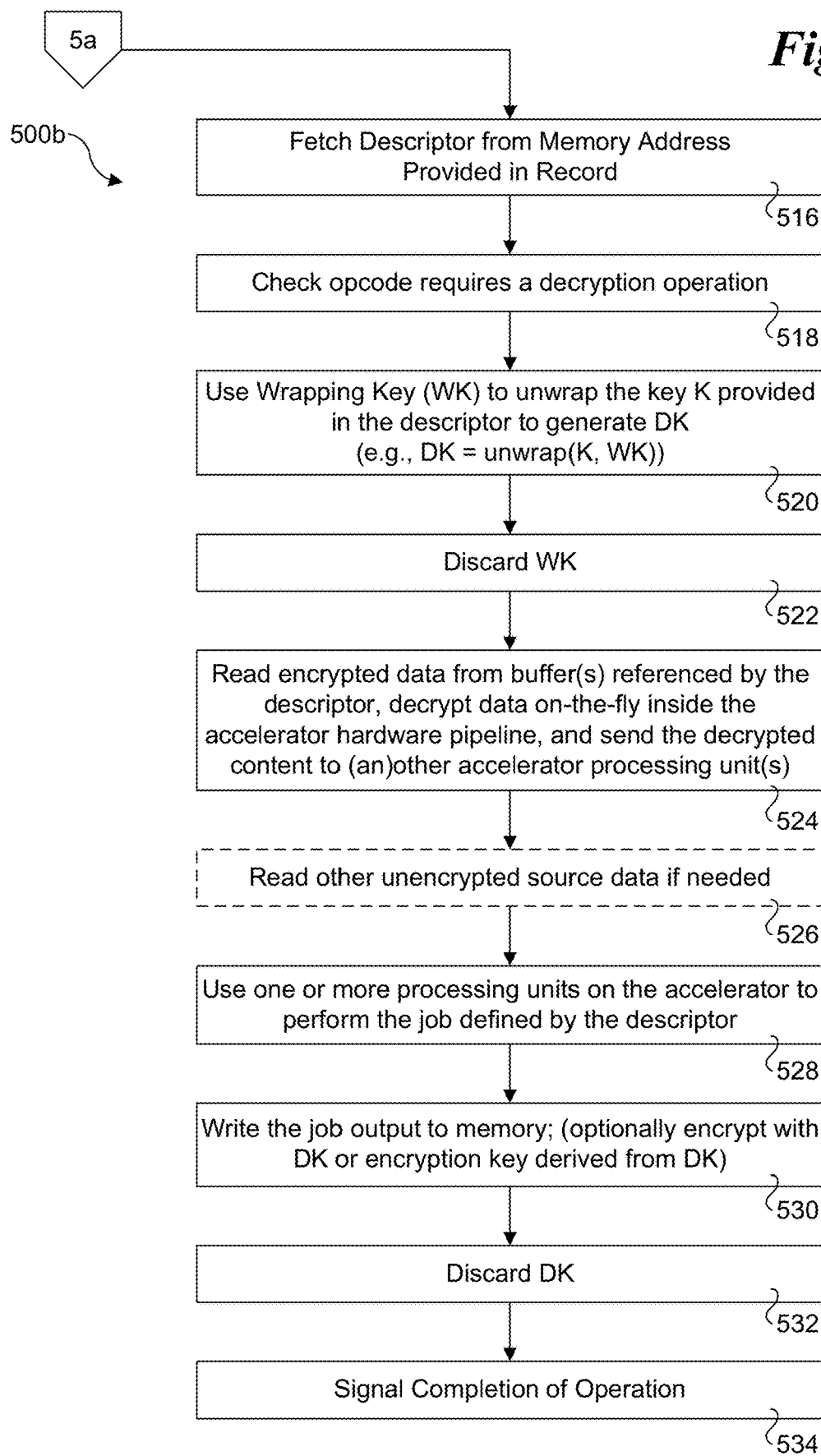
FIG. 5b is a flowchart illustrating operations and logic performed by an accelerator during processing of a job associated with a request descriptor that has been enqueued with the Enq_with_WK_v1 instruction, according to one embodiment.
Figure 6A:
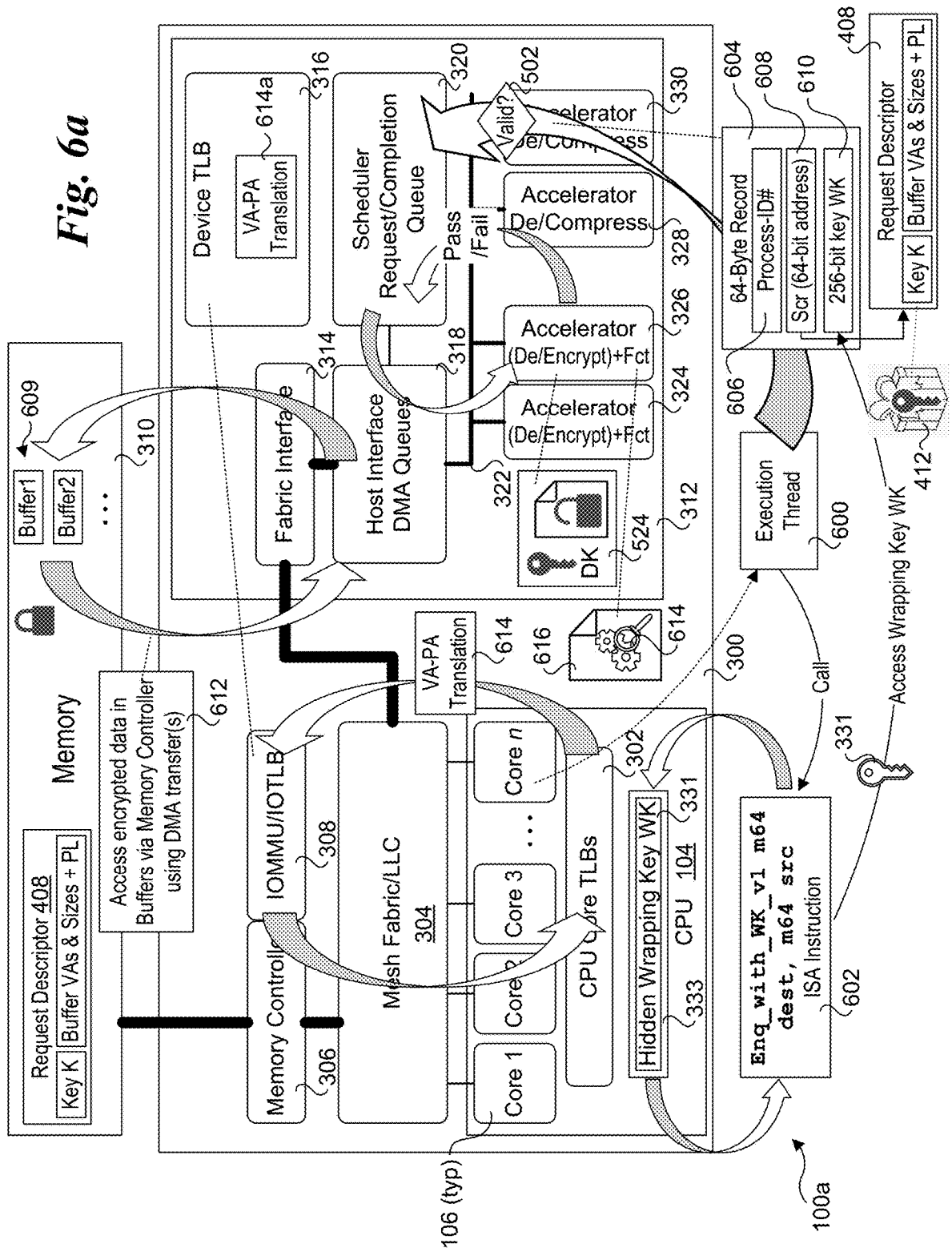
Figure 6B:
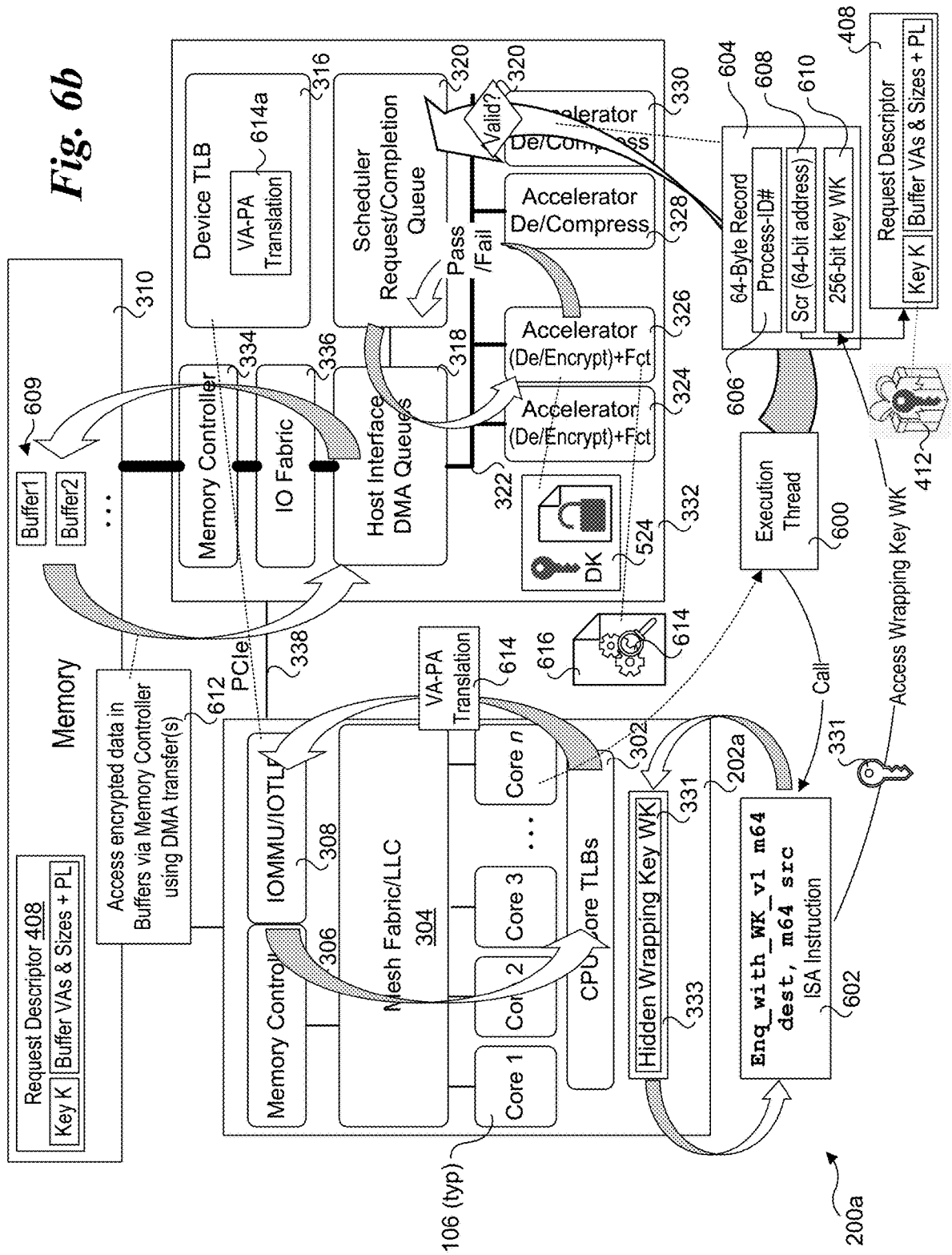
FIG. 6b is a combined schematic and dataflow diagram illustrating one embodiment of an implementation of the Enq_with_WK_v1 instruction using the platform architecture of FIG. 3b.

Further details of this process are shown in flowchart 500b of FIG. 5b and schematically illustrated in FIGS. 6a and 6b. In a block 516 the descriptor is fetched from the memory address (src) provided in the record (written in block 506). In a block 518, the opcode is checked to see if it requires a decryption operation. In a block 520, the wrapping key WK is used to unwrap the wrapped key K provided in the descriptor to generate a new key DK. WK is then discarded in a block 522.

In a block 524 encrypted data from one or more buffers identified in the descriptor are read using DMA transfers and decrypted on-the-fly inside the accelerator hardware pipeline, and then the decrypted content is sent to one or more other processing units that will be used to perform one or more functions associated with the requested job. In an optional block 526, other unencrypted source data is read, if needed. In a block 528, the one or more other functional units in the accelerator are used to perform the job defined by the descriptor. For example, operations for the job might be to scan for specific values or ranges, perform decompression of decrypted data, perform compression of decrypted data, etc. In a block 530, the output of the job processing is written to memory, which may optionally be encrypted using key DK or an encryption key derived from DK. DK is then discarded in a block 532, with a signal indicating completion of the operation provided in a block 534.

FIG. 6a shows an implementation of the Enq_with_WK_v1 instruction using platform architecture 100a of FIG. 3a. In this example, an execution thread 600 executing on Core n calls the Enq_with_WK_v1 instruction (depicted in a block 602) with applicable data being loaded into the operands discussed above, including references (e.g., pointers) to the virtual addresses of the buffers. Execution of the Enq_with_WK_v1 instruction provides access to the WK (hidden wrapping key WK 331) stored in hidden CPU register 333. It also creates a 64-byte record 604 which is written to an accelerator portal (not shown) of schedular request/completion queue 320 if dest is a valid accelerator portal address, as determined in decision block 502. 64-byte record 604 includes a process-ID#606, scr address 608, and a 246-bit WK 610.

As further illustrated in FIG. 6a, the accelerator associated with the accelerator portal and scheduled to do the work defined in request descriptor 408 is accelerator 326. This accelerator with inspect the record that is written (as part of its work queue), and return a pass ACK, indicating access to the accelerator is permitted. At this point, accelerator 326 will use scr address 608 to read request descriptor 408 from memory 310. As discussed above, the request descriptor will include the virtual addresses and sizes of one or more input buffers and one or more output buffers, as well as other payload (PL) 416.

At this point, accelerator 326 will use the buffer virtual address information to access the one or more input buffers 609 in memory 310, which contain data to be processed by the job that is stored in an encrypted form. As illustrated by a block 612, the encrypted data in input buffers 609 is accessed via memory controller 306 using DMA transfers. Memory 310 is implemented by one or more physical devices, such as DDR4 DIMMS (Dual Inline Memory Modules) or NVDIMMS having physical address spaces. Accordingly, it is necessary to perform a Virtual Address-to-Physical Address (VA-PA) translation to access the buffer in memory 310. This may be done using IOMMU/IOTLB 308, which is used to perform VA-PA translation 614, as described in detail below referencing FIGS. 7 and 8. As an option, VA-PA translation information for one or more of the input buffers may be cached in device TLB 316. Accordingly, in one embodiment device TLB 316 may be snooped to see if it has an entry corresponding to the VA address of a buffer and use the corresponding VA-PA entry if it does (as depicted by VA-PA translation 614a), otherwise use IOMMU/IOTLB 308 to obtain the VA-PA translation.

Having the physical address of the buffer enables processor 300 to access the encrypted data stored in the input buffers using the virtual addresses specified in request descriptor 408. Using the DMA transfers, the encrypted data is written to a DMA queue in host interface DMA queues 318. Generally, the encrypted data in the one or more input buffers 609 may be read from memory 310 and DMA'ed to a DMA queue using an ongoing sequence of DMA transfers to effectively stream encrypted data to a DMA queue. The encrypted data in the DMA is then decrypted on-the-fly (e.g., as it is being streamed) by a decryption unit in accelerator 326 using decryption key DK. The decrypted data is then forwarded internally to one or more other processing units in accelerator 326 that are configured to perform applicable functions specified by the job, such as decompression, for example. This processing is depicted by an engine 616 working on decrypted data 618. Upon completion of the job, the data output by the applicable processing units is written back to memory (block 530 of FIG. 5b, not shown in FIG. 6a), and a completion record is posted to a completion queue in schedular request/completion queue 320 (block 534 of FIG. 5b, not shown in FIG. 6a). As discusses above, the data output from the accelerator processing may be encrypted prior to being written back memory.

FIG. 6b shows operations and components for performing similar operations illustrated in FIG. 6a using the off-chip accelerator architecture of FIG. 3b, where like-numbered components and blocks perform similar operations and/or function. A primary difference between the embodiments of FIGS. 6a and 6b is that DMA memory transfers are performed using memory controller 334 on off-chip accelerator 332 rather than memory controller 306 on processor 300.

In accordance with further aspects of various embodiments described and illustrated herein, including the embodiments of FIGS. 6a and 6b, TLB entries comprising VA-PA translations are read or copied from TLBs and used (either the VA-PA translation or just the PA) to facilitate access to data stored in buffers in system memory. To better understand operations associated with reading/copying TLB entries in accordance with embodiments described herein, a discussion of the operation of an exemplary 64-bit TLB architecture is now provided, with reference to FIGS. 7 and 8.

The 64-bit architecture employs a virtual addressing model, which is fundamentally a 64-bit flat linear address space. 64-bit registers are used as pointers into this address space. The architecture also supports 32-bit virtual linear addresses, which are zero extended into the 64-bit virtual address space.

The 64-bit virtual address space is divided into eight $2^{61}$ byte virtual regions. A region is selected by the upper 3-bits of the virtual address. Associated with each virtual region is a region register that specifies a 24-bit region identifier for the region. Eight out of the possible $2^{24}$ virtual address spaces are concurrently accessible via 8 region registers. If desired, regions can be coalesced by assigning sequential region identifiers, e.g., to produce 62-, 63-, or 64-bit spaces.

Figure 7:
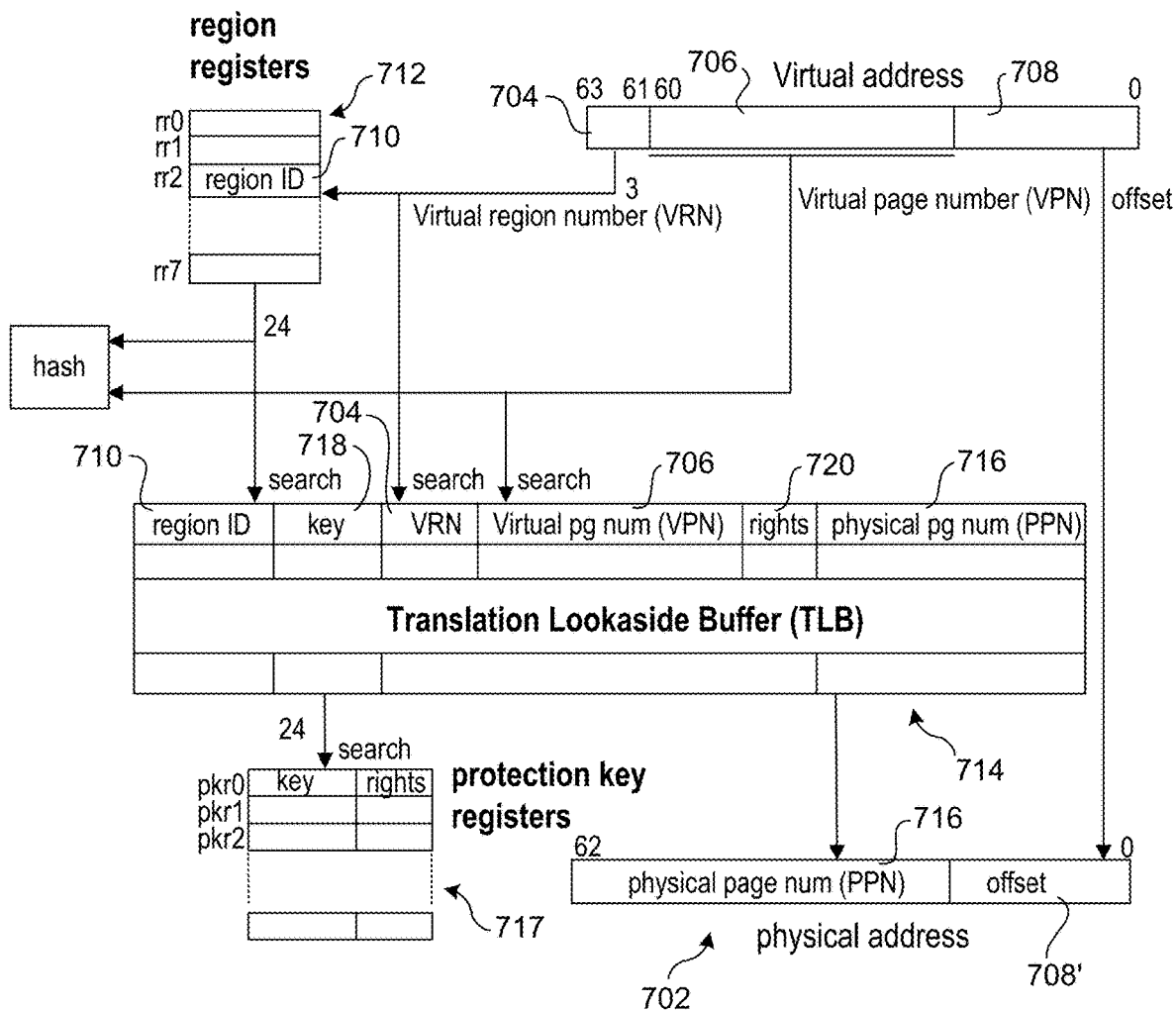
FIG. 7 is a schematic diagram of an address translation scheme including a translation lookaside buffer (TLB) employed by 64-bit processor architecture.

FIG. 7 shows the process of mapping (also referred to as "translating") a virtual address 700 into a physical address 702, resulting in a VA-PA translation. The bits of virtual address 700 are divided into three fields: 704, 706, and 708. Field 704 comprises the most-significant three bits 61-63, which are used to point to a virtual region number (VRN). Field 708, which comprise the least significant bits, form the page offset. The remaining bits, comprising field 706, are used to specify a virtual page number (VPN). The page-offset bits (field 708) are passed through the translation process unmodified, as shown by a physical address page offset 708'. Exact bit positions for the page offset and VPN bits (field 706) vary depending on the page size used in the virtual mapping. Allowable page sizes include 4K, 8K, 16K, 64K, 256K, 1M, 4M, 16M, 64M, 256M, and 4G.

On a memory reference (other than an insert or purge), the VRN bits of field 704 select a region identifier (RID) 710 from one of the eight region registers 712. A TLB 214 is then searched for a translation entry with a matching VPN and RID value. If a matching translation entry is found, the entry's physical page number (PPN) 716 is concatenated with the page-offset bits (offset 208') to form the physical address 702. Matching translations are qualified by page-granular privilege level access right checks and optional protection domain checks by verifying the translation's key is contained within a set of protection key registers 717 and read, write, or execute permissions are granted. The key value is defined in the TLB's key field 718, while access rights are specified in a rights field 720.

If a translation is not resident in the TLB, the processor may optionally search a virtual hash page table (VHPT) structure in memory (not shown) for the required translation and install the entry into the TLB. If the required entry cannot be found in either the TLB or VHPT, the processor raises a TLB Miss fault to request that the operating system supply the translation. After the operating system installs the translation in the TLB and/or VHPT, the faulting instruction can be restarted and execution resumes.

Figure 8:
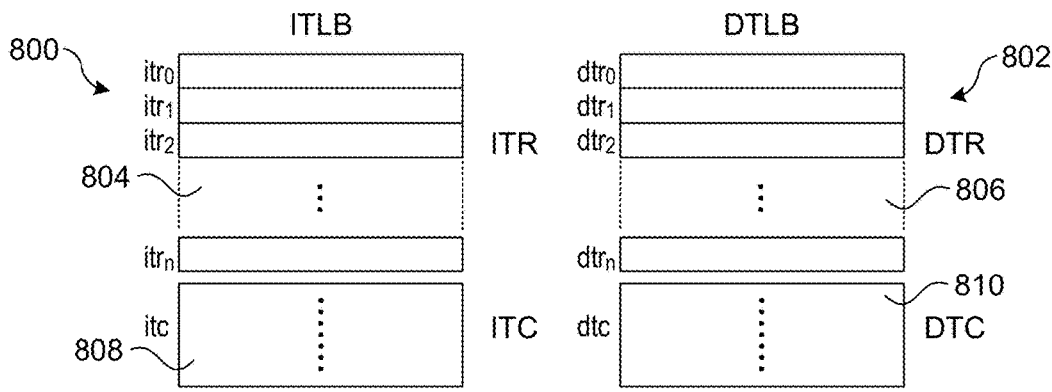
FIG. 8 is a schematic diagram illustrating further details of the TLB of FIG. 7, including translation registers.

In one embodiment, a 64-bit processor maintains two architectural TLBs, as shown in FIG. 8, including an instruction TLB (ITLB) 800 and a data TLB (DLTB) 802. Each TLB services translation requests for instruction and data memory references, respectively. The data TLB 802 also services translation request for references by the RSE and the VHPT walker. Each of instruction TLB 800 and the data TLB 802 are further divided into two sub-sections: Translation Registers (TR) (ITR 804 and DTR 806) and Translation Cache (TC) (ITC 808 and DTC 810).

The Translation Register section of the TLB is a fully-associative array defined to hold translations directly managed by software (e.g. an OS) and/or firmware. Software/firmware may explicitly insert a translation into a TR by specifying a register slot number. Translations are removed from the TRs by specifying a virtual address, page size and a region identifier. Translation registers allow the operating system to "pin" critical virtual memory translations in the TLB. Examples include I/O spaces, kernel memory areas, frame buffers, page tables, sensitive interruption code, etc.

Entries are placed into a specific TR slot with the Insert Translation Register (itr) instruction. Once a translation is inserted, the processor will not automatically replace the translation to make room for other translations. Local translations can only be removed by issuing the Purge Translation Register (ptr) instruction.

It will be appreciated by those having skill in the art that the foregoing description of a 64-bit TLB and associated architecture illustrated in FIGS. 7 and 8 are merely exemplary of one type of TLB and not limiting. Other types of TLB architecture may be implement in accordance with the principles and teachings of the embodiments herein using techniques that are well-known in the art.

IO devices that are SVM capable perform address translations before read/write transactions are submitted on the IO fabrics. One mechanism is to have a TLB in the device that caches some translations. If the translation cannot be serviced by the Device-TLB, the request is sent to the IOTLB in the IOMMU. The address translation is performed by the IOMMU by looking up the IOTLB and if there is no entry, initiating page walks. In the event of page faults, the IOMMU reports the event to software. More details can be found in the PCISIG standard under ATS (address translation service) (for example, see generally, PCI Express Address Translation Service 1.1). Under PCIe, the IOTLB is also referred to as the Address Translation Cache (ATC) to differentiate it from the TLB(s) used by the CPU. Optionally, an ATC may be stored separate from the IOTLB, with updates to the ATC being copied to the IOTLB.

In some embodiments, the PCIe ATS is accessed by emulating a PCIe device. For example, under embodiments of the on-chip accelerators described here, such as illustrated in FIG. 3a, the accelerator is coupled to the mesh fabric via a fabric interface that does not employ PCIe. To access the PCIe ATS, the accelerator emulates a PCIe device by using PCIe protocol messages that are encapsulated within messages sent via the fabric interface. The mesh fabric interconnect structure includes a PCIe-to-Fabric bridge that is configured to interface a PCIe interconnect with the fabric interconnect. At the bridge, the encapsulated PCIe messages are de-encapsulated and forwarded to an applicable PCIe component on the processor, such as the PCIe root complex.

Variations of ISA ENQ Instructions with Wrapping Keys

In the foregoing embodiments, security of the Enq_with_WK_v1 is insured by verifying dest is a valid accelerator portal address. In another embodiment, WK (itself) is associated with a small list of allowed ENQ portals. This can only be done in the highest privilege mode, such as during boot flows. Under this approach the instruction only executes if the user provides an authorized portal. This can prevent attacks where a compromised accelerator can leak information relating to the keys. In one embodiment, only integrated accelerators (i.e., on-chip accelerators) can be accessed in this mode with this instruction.

In some embodiments, there is one wrapping key per CPU socket. Alternatively, there may be a respective wrapping key per physical processor core, or for each of a portion of the processor cores in a multi-core processor.

Under a more general extension, software is permitted to send a key from any register in the software's execution context. For example, in one embodiment this register may be loaded from a Transit Layer Security (TLS) session with a Key Management System (KMS) in the cloud (i.e., hosted on servers access over a network, such as a part of cloud-based services provided by Amazon (Amazon Web Services), Microsoft (Azure Cloud), etc.), enabling a high-value key to be retrieved into a register without storing it in memory. Under this approach, the WK retrieved from the processor register is included as part of the record written by the ENQ instruction.

An example of a new Enq_with_WK_v2 ISA instruction configured to support the foregoing functionality is shown in LISTING 2.

LISTING 2

```
1.   Enq_with_WK_v2 m64 dest, m64 src, YMM scr2 {
2.   // dest has the address of Accelerator portal to enqueue the job
3.   // src has the address of the descriptor from the user
4.   // application
5.   // assume descriptor has a format such as:
6.   //    num-input-buffers
7.   //    input-buffer1-pointer
8.   //    input-buffer1-size
9.   //    input-buffer2-pointer
10.  //    input-buffer2-size
11.  //    . . .
12.  //    num-output-buffers
13.  //    output-buffer1-pointer
14.  //    output-buffer1-size
15.  //    . . .
16.  //    Key K (wrapped)
17.  //    Other payload (e.g., function opcodes, completion records,
18.  // . . .) PL
19.
20.  Check if dest is a legitimate accelerator portal
21.  Write a 64-byte (Cache-line sized) record to dest consisting of:
22.      Process-ID#
23.      Src (64-bit address)
24.      256-bit wrapping key WK from YMM src2
25.
26.  Wait for acknowledgement from Accelerator
27.  Return pass/fail
28. }
```

In addition to the dest and src operands, the Enq_with_WK_v2 ISA instruction further includes a third operand YMM scr2, where scr2 is the address of a YMM register in which the WK (that has been previously accessed via the cloud) is stored. YMM is part of the Advanced Vector Extensions (AVX) defined for x86 ISA processors in 2008, and since enhanced under AVX2. When the 64-byte record is created (lines 20-23), it includes a 256-bit wrapping key that is read from the YMM register having the scr2 address rather than read from a specific CPU register used to stored wrapping keys.

In the foregoing Enq_with_WK_v2 ENQ instruction, the key from the register can be a wrapping key (as shown in LISTING 2) or the actual key itself. The opcode can be constructed to handle either scenario in the accelerator.

Under another approach, the CPU and accelerator pre-share the wrapping key (either via authenticated key exchange using link encryption or by other trusted means at boot-up time). This results in the CPU having an accelerator-specific wrapping key. The accelerator specific handle is written to the accelerator as part of the ENQ command. Since the accelerator has the wrapping key, it can do one unwrap to find the secret key, then use that key to perform jobs defined by corresponding request descriptors that are enqueued for the accelerator.

The format and pseudocode for third variant of the ENQ instruction (Enq_with_WK_v3) is shown in LISTING 3.

LISTING 3

```
1.   Enq_with_WK_v3 m64 dest, m64 src, YMM src2 {
2.   // dest has the address of Accelerator portal to enqueue the job
3.   // src has the address of the descriptor from the user
4.   // application
5.   // assume descriptor has a format such as:
6.   //    num-input-buffers
7.   //    input-buffer1-pointer
8.   //    input-buffer1-size
9.   //    input-buffer2-pointer
10.  //    input-buffer2-size
11.  //    . . .
```

-continued

LISTING 3

```
12.  //    num-output-buffers
13.  //    output-buffer1-pointer
14.  //    output-buffer1-size
15.  //    . . .
16.  //    Key K (wrapped)
17.  //    Other payload (e.g., function opcodes, completion records,
18.  // . . .) PL
19.
20.  Check if dest is a legitimate accelerator portal
21.  Write a 64-byte (Cache-line sized) record to dest consisting of:
22.      Process-ID#
23.      Src (64-bit address)
24.      256-bit wrapping key WK from YMM scr2
25.      wrapped with dest->accelerator wrapping key
26.  Wait for acknowledgement from Accelerator
27.  Return pass/fail
28. }
```

Under Enq_with_WK_v3 ISA ENQ instruction there is an accelerator-specific wrapping key WK for the destination accelerator (i.e., the accelerator that uses the ENQ portal address defined by dest). In order to prevent replays, the ENQ commands disclosed herein can also use a monotonic counter as an input to the key wrapping.

In one embodiment, each of the foregoing Enq_with_WK_v1, Enq_with_WK_v2, and Enq_with_WK_v3 instructions may be implemented in processors employing an x86 ISA. However, this is merely exemplary and non-limiting, as variants of the foregoing instructions may be implemented on various processor architectures. For example, consider the RISC-style Arm processor. The ARM instructions are generally capable of 3 operands. They have integer scalar instructions that work on general-purpose registers (GPRs) (e.g., 16 or 32 registers), and vector/floating-point instructions that work on 128-bit SIMD (called Neon) registers.

Figure 9:
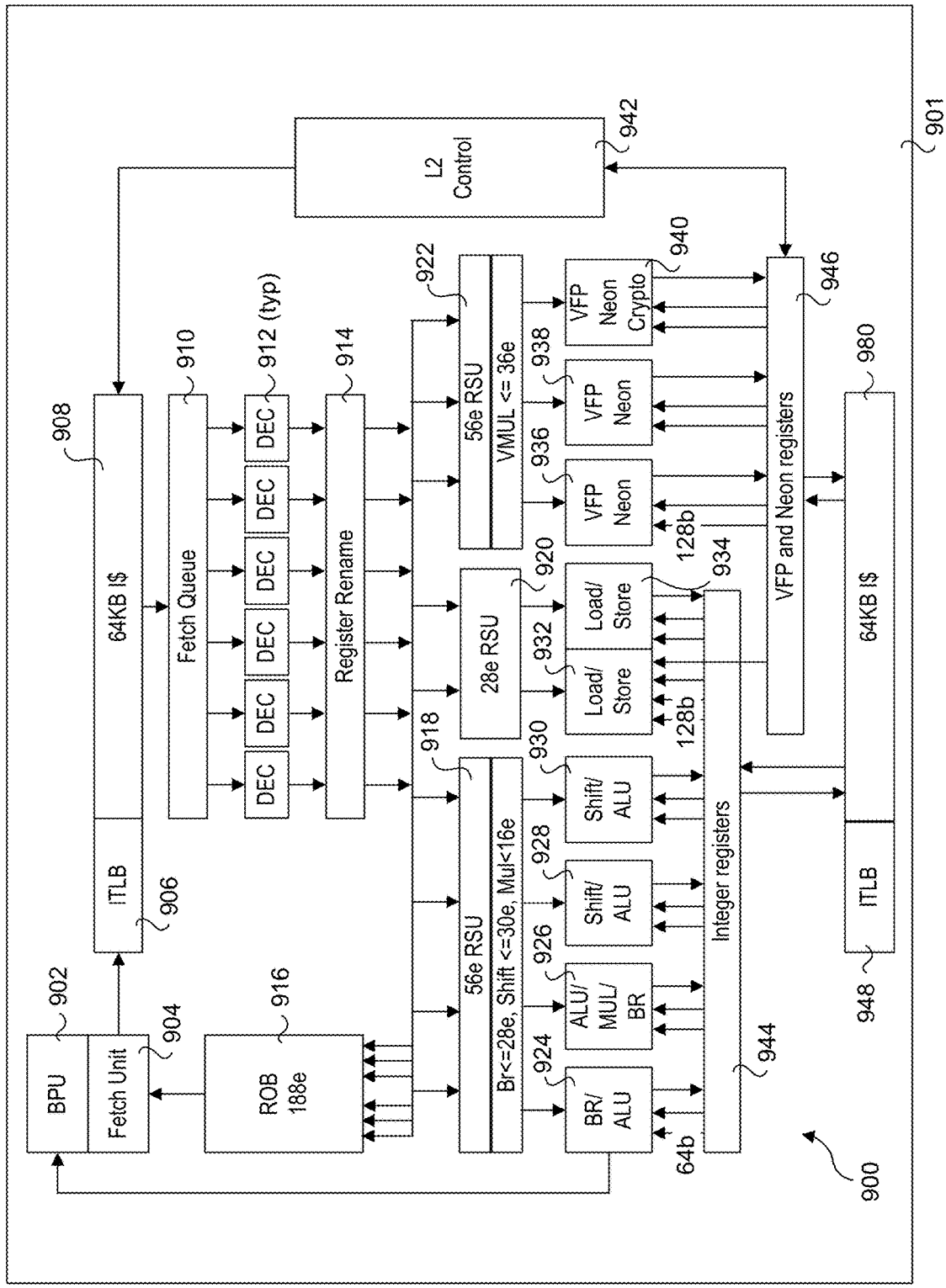
FIG. 9 is a schematic block diagram illustrating an example of an Arm-based microarchitecture suitable for implementing the Instruction Set Architecture (ISA) instructions disclosed herein.

An example of one embodiment of an Arm processor microarchitecture 900, is shown in FIG. 9. Microarchitecture 900 includes a branch prediction unit (BPU) 902, a fetch unit 904, an instruction translation look-aside buffer (ITLB) 906, a 64 KB (Kilobyte) instruction store 908, a fetch queue 910, a plurality of decoders (DECs) 912, a register rename block 914, a reorder buffer (ROB) 916, reservation station units (RSUs) 918, 920, and 922, a branch arithmetic logic unit (BR/ALU) 924, an ALU/MUL(Multiplier)/BR 926, shift/ALUs 928 and 930, and load/store blocks 932 and 934. Microarchitecture 900 further includes vector/floating-point (VFP) Neon blocks 936 and 938, and VFP Neon cryptographic block 940, an L2 control block 942, integer registers 944, 128-bit VFP and Neon registers 946, an ITLB 948, and a 64 KB instruction store 950.

Generally, the each of the Enq_with_WK_v1, Enq_with_WK_v2, and Enq_with_WK_v3 instructions described herein may be implement using embedded logic (e.g., via circuitry), microcode, or a combination of the two. Under an Arm microarchitecture, general-purpose registers may be used for the 64-bit m64 and r64 operands. It will be further be recognized by those having skill in the art that an ISA instruction, such as the Enq_with_WK_v1, Enq_with_WK_v2, and Enq_with_WK_v3 instructions, is part of the instructions in an instruction set architecture for a given processor architecture (and/or processor core(s) within the processor architecture, which are sometimes referred to as machine instructions.

Figure 10:
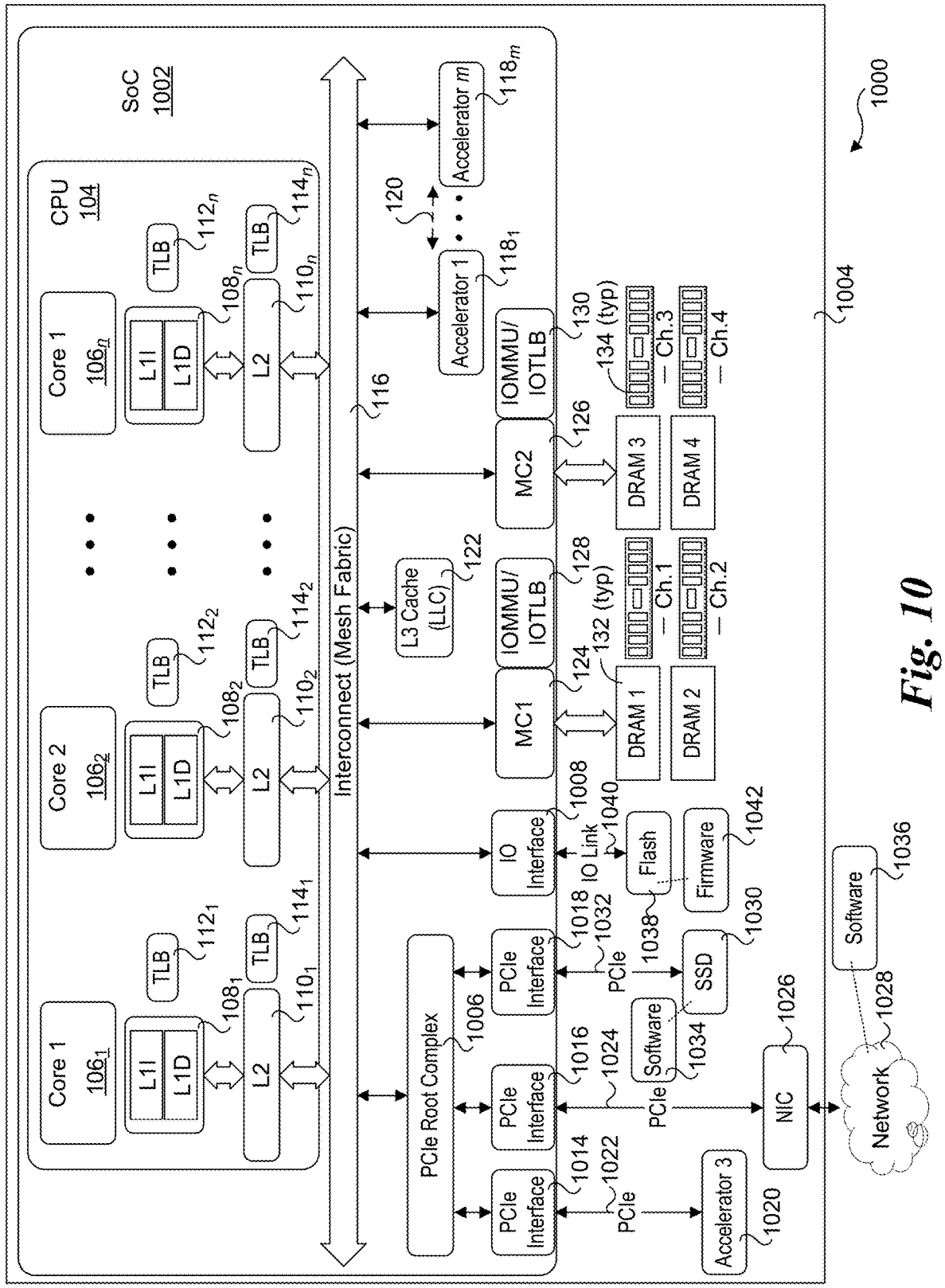
FIG. 10 is a schematic diagram illustrating further details of an exemplary platform architecture, according to one embodiment.

Due to space limitations, the processors 102 and 202 in FIGS. 1 and 2 are shown in simplified form. FIG. 10 shows a platform architecture 1000 showing further details of a processor 1002 and platform components that generally may be included in platform architecture 100 and 200 of FIGS. 1 and 2. Platform architecture 1000 includes a main board 1004 to which various components are mounted and/or otherwise communicatively coupled, including processor 1002. As before, processor 1002 includes a CPU 104 including n processor cores $106_1$-$106_n$ coupled to L1 caches $108_1$-$108_n$ and L2 caches $110_1$-$110_n$. As further illustrated each L1 cache $108_1$-$108_n$ includes both an instruction cache (L1I) and a data cache (L1D), and each of the L1 and L2 caches is associated with a respective translation lookaside buffer (TLB), as illustrated by TLBs $112_1$-$112_n$ for L1 caches $108_1$-$108_n$ and TLBS $114_1$-$114_n$ for L2 caches $110_1$-$110_n$. L2 caches $110_1$-$110_n$ are connected to interconnect 116.

Also connected to interconnect 116 are a PCIe root complex 1006, and L3 cache 122, accelerators $118_1$-$118_m$, an IO interface 1008, and memory controllers 124 and 126 (also labeled MC1 and MC2).

PCIe root complex 1006 will generally be coupled to one or more PCIe interfaces, as depicted by PCIe interfaces 1014, 1016, and 1018. Generally, all or a portion of the PCIe interfaces and PCIe links may be connected to PCIe expansion slots (not shown) mounted on main board 1004. PCIe interface 1014 is depicted as being connected to an off-chip accelerator 1020 via a PCIe link 1022. As discussed above, an off-chip accelerator may comprise an accelerator chip or the like that is either mounted to the platform's main board or installed on an accelerator board or card mounted in a PCIe expansion slot.

PCIe interface 1016 is connected (via a PCIe link 1024) to a NIC 1026 that provides access to a network 1028. Generally, NIC 1026 is representative of various types of network interface adaptors and fabric adaptors, including but not limited to Ethernet adaptors, InfiniBand host controller adaptors (HCAs) and INTEL® OmniPath host fabric interfaces (HFIs).

PCIe interface 1018 is connected to a solid-state drive (SSD) 1030 via a PCIe link 1032. Optionally, other types of IO interfaces may be used to enable a processor to communicate with an SSD. As shown, system software 1034 is stored on SSD 1030. The system software may generally include an operating system and one or more application that run on the operating system. The system software may also support various types of virtualized embodiments, including virtualized platforms that implement Type-1 and Type-2 Hypervisors, as well as container-based virtualization environments. As further depicted by software 1036, all or a portion of the system software may be loaded during platform boot over network 1028.

IO interface 1008 is connected to a firmware storage device, such as a flash device 1038 via an IO link 1040. Flash device 1038 stores system firmware 1042, which is loaded as part of the platform's initialization. Generally, various types of firmware may be used depending on the platform, including firmware that employs the Universal Extensible Firmware Interface (UEFI) architecture. All or a portion of the firmware may also be referred to as BIOS (Basic Input Output System), for historical reasons.

Generally, a processor may include one or more memory controllers, each having one or more memory channels connected to one or more memory devices, as discussed above. The embodiment of FIG. 10 includes two memory controllers 124 and 126. Memory controller 124 is coupled to memory devices DRAM 1 and DRAM 2 via respective memory channels 1 and 2. Memory controller 126 is coupled to memory devices DRAM 3 and DRAM 4 via respective memory channels 3 and 4.

In addition to an off-chip accelerator having a memory controller and being configured to directly access system memory via the memory controller, off-chip accelerators may not include a memory controller and access the system memory through DMA operations forwarded through the processor via a memory controller on the processor. For example, one or more accelerators may be installed in an expansion card or board installed in a PCIe expansion slot. From an architecture standpoint, each of the accelerators on the card or board operate as a PCIe device. However, since the PCIe links connecting the processor to a PCIe expansion slots are not coupled to system memory, PCIe devices on card or boards installed in PCIe expansion slots cannot access system memory directly, and thus use the foregoing DMA operations.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, or engines herein may be a means for performing the functions described. The operations and functions performed by various components described herein may be implemented by software running on a processing element, via embedded hardware or the like, or a combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed on a computing platform having a multi-core processor coupled to one or more memory devices comprising system memory implemented as shared virtual memory (SVM), the multi-core processor having a plurality of processor cores and including at least one memory controller operatively coupled via at least one memory channel to one or more memory devices, the computing platform further including one or more SVM-capable accelerators having one or more functional units, the method comprising:
    enqueuing, via execution of an execution thread on one of the plurality of processor cores, a record including a wrapping key and referencing a request descriptor for an accelerator or including a request descriptor for an accelerator including a wrapping key, the request descriptor defining a job to be performed by the accelerator and including information associated with one or more buffers in the system memory to be accessed by the accelerator as part of the job and including a key; and
    using the accelerator to process the job, wherein the accelerator,
        generates a decryption key using the wrapping key to unwrap the key in the request descriptor;
        decrypts encrypted data read from the one or more buffers in the system memory using the decryption key to produce decrypted data; and
        processes the decrypted data to perform one or more functions.

2. The method of claim 1, further comprising accessing, via execution of an instruction set architecture (ISA) enqueue (ENQ) instruction in the execution thread, the wrapping key from a register in the multi-core processor.

3. The method of claim 2, wherein the register is a protected hidden wrapping key register in the multi-core processor.

4. The method of claim 2, wherein the ISA ENQ instruction includes an operand defining an address of the register in the multi-core processor in which the wrapping key is stored.

5. The method of claim 1, wherein the execution thread includes an instruction set architecture (ISA) enqueue (ENQ) instruction that includes an operand defining an address of an accelerator portal, and wherein execution of the ISA ENQ instruction causes the computing platform to:
    check if the address is a valid address for an accelerator portal; and
    if the address is a valid address for an accelerator portal, write the record including a wrapping key and referencing a request descriptor for an accelerator to the address.

6. The method of claim 5, further comprising receiving an acknowledgement indicating whether the record is successfully enqueued in a job queue for the accelerator.

7. The method of claim 1, wherein the accelerator is an off-chip accelerator that is coupled to the multi-core processor.

8. The method of claim 1, wherein the multi-core processor is a System on a Chip (SoC) that includes the accelerator.

9. The method of claim 1, wherein the execution thread is executed in user-mode.

10. The method of claim 1, further comprising:
    using the decryption key that is generated or an encryption key derived from the decryption key to encrypt data generated by performing the one or more functions and write the encrypted data to the system memory.

11. A computer system, comprising:
    a multi-core processor, including:
        a plurality of processor cores;
        a plurality of processor registers;
        an interconnect fabric, communicatively coupled to each processor core;
        a memory controller, communicatively coupled to the interconnect fabric and having one or more memory channels; and
        an input-output (IO) interface, communicatively coupled to the interconnect fabric;
    system memory comprising one or more memory devices, each communicatively coupled to at least one memory channel of the memory controller; and
    a shared virtual memory (SVM)-capable accelerator having one or more functional units, either embedded on the processor or communicatively coupled to the processor via the IO interface;
    wherein the system is configured to,
        enqueue, via execution of an execution thread on one of the plurality of processor cores, a record including a wrapping key and referencing a request descriptor for an accelerator or a request descriptor for an accelerator including a wrapping key, the request descriptor defining a job to be performed by the accelerator and including information associated with one or more buffers in the system memory to be accessed by the accelerator as part of the job and including a key; and
        process the job, wherein the accelerator,
            generates a decryption key using the wrapping key to unwrap the key in the request descriptor;
            decrypts encrypted data read from the one or more buffers in the system memory using the decryption key to produce decrypted data; and
            processes the decrypted data to perform one or more functions specified by the job.

12. The computer system of claim 11, wherein the multi-core processor has an instruction set architecture (ISA) including an enqueue (ENQ) instruction that, upon execution, accesses the wrapping key from one of the plurality of registers in the multi-core processor.

13. The computer system of claim 12, wherein the register is a protected hidden wrapping key register in the multi-core processor.

14. The computer system of claim 12, wherein the ISA ENQ instruction includes an operand defining an address of the register in the multi-core processor.

15. The computer system of claim 11, wherein the multi-core processor has an instruction set architecture (ISA) including an enqueue (ENQ) instruction that includes an operand defining an address of an accelerator portal, and wherein execution of the ISA ENQ instruction causes the computer system to:

check if the address is a valid address for an accelerator portal; and
if the address is a valid address for an accelerator portal, write the record including a wrapping key and referencing a request descriptor for an accelerator to the address.

16. The computer system of claim 15, wherein the ENQ instruction is configured to return an acknowledgement indicating whether the record is successfully enqueued in a job queue for the accelerator.

17. The computer system of claim 11, wherein the computer system includes a main board, and wherein the accelerator is an off-chip accelerator that is included in an accelerator board or card installed in an expansion slot of the main board or mounted to the main board.

18. The computer system of claim 17, wherein the accelerator board or card includes a second memory controller that is communicatively coupled to the system memory, and
wherein data in the one or more buffers in system memory area are read by the second memory controller using direct memory access (DMA) operations.

19. The computer system of claim 11, wherein the execution thread is executed in user-mode.

20. The computer system of claim 11, wherein the computer system is further configured to use the decryption key or an encryption key derived from the decryption key to encrypt data generated from performing the one or more functions and write the encrypted data to the system memory.

21. A System on a Chip (SoC) processor comprising:
a plurality of processor cores;
a plurality of processor registers;
an interconnect fabric, communicatively coupled to each processor core;
a memory controller, communicatively coupled to the interconnect fabric and having one or more memory channels;
one or more accelerators, communicatively coupled to the interconnect fabric, each accelerator having one or more functional units; and
at least one request descriptor queue;
wherein the processor is configured to be installed in a computer system including system memory comprising one or more memory devices coupled to the one or more memory channels when the processor is installed in the computer system, the computer system employing a shared virtual memory (SVM) architecture, and wherein each of at least a portion of the processor cores has an instruction set architecture (ISA) including an enqueue (ENQ) instruction that, upon execution, causes the processor to:
enqueue a record in a request descriptor queue including a wrapping key and referencing an address of a request descriptor, the request descriptor defining a job to be performed by an accelerator among the one or more accelerators and including information associated with one or more buffers in the system memory to be accessed by the accelerator as part of the job and including a wrapped key; and
wherein the accelerator is configured to,
read the request descriptor referenced in the record from system memory;
access the wrapping key from the accelerator portal;
generate a decryption key using the wrapping key to unwrap the wrapped key in the request descriptor;
decrypt encrypted data read from the one or more buffers in the system memory using the decryption key to produce decrypted data; and
process the decrypted data to perform one of more functions specified by the job.

22. The SoC processor of claim 21, wherein the wrapping key is stored in a protected hidden wrapping key register in the processor, and wherein the ISA ENQ instruction enables the wrapping key to be accessed from the hidden wrapping key register.

23. The SoC processor of claim 21, wherein the SoC processor further includes at least one accelerator portal, wherein the ISA ENQ instruction includes an operand defining an address of an accelerator portal, and wherein execution of the ISA ENQ instruction causes the processor to:
check if the address is a valid address for an accelerator portal; and
if the address is a valid address for an accelerator portal, write the record including the wrapping key or the request descriptor including the wrapping key to the address.

24. The SoC processor of claim 21, wherein the ISA ENQ instruction is configured to be executed as part of an instruction thread executing in user-mode.

25. The SoC processor of claim 21, wherein the accelerator is configured to use the decryption key or an encryption key derived from the decryption key to encrypt data generated from performing the one or more functions and write the encrypted data to the system memory.

* * * * *